(12) United States Patent
Hauck

(10) Patent No.: US 11,154,768 B2
(45) Date of Patent: Oct. 26, 2021

(54) EDUCATIONAL GAME AND METHOD OF MAKING SAME

(71) Applicant: Lane Thomas Hauck, San Diego, CA (US)

(72) Inventor: Lane Thomas Hauck, San Diego, CA (US)

(*) Notice: Subject to any disclaimer, the term of this patent is extended or adjusted under 35 U.S.C. 154(b) by 160 days.

(21) Appl. No.: 16/703,434

(22) Filed: Dec. 4, 2019

(65) Prior Publication Data

US 2020/0215423 A1 Jul. 9, 2020

Related U.S. Application Data

(60) Provisional application No. 62/789,109, filed on Jan. 7, 2019.

(51) Int. Cl.
| | |
|---|---|
| *A63F 7/02* | (2006.01) |
| *A63F 7/04* | (2006.01) |
| *A63F 9/00* | (2006.01) |
| *G09B 17/00* | (2006.01) |
| *A63F 7/38* | (2006.01) |
| *A63F 7/30* | (2006.01) |

(52) U.S. Cl.
CPC ............ *A63F 7/02* (2013.01); *A63F 7/044* (2013.01); *A63F 9/0098* (2013.01); *A63F 7/041* (2013.01); *A63F 7/30* (2013.01); *A63F 7/382* (2013.01); *A63F 2007/3035* (2013.01); *G09B 17/00* (2013.01)

(58) Field of Classification Search
CPC .......... A63F 7/02; A63F 7/044; A63F 9/0098; A63F 7/382; A63F 7/30; A63F 2007/3035; A63F 7/041; G09B 17/00
See application file for complete search history.

(56) References Cited

U.S. PATENT DOCUMENTS

| | | | | | |
|---|---|---|---|---|---|
| 2,175,971 | A | * | 10/1939 | Perry | ......................... A63F 7/02 273/121 B |
| 2,571,521 | A | * | 10/1951 | Barnhart | ................... A63F 7/02 446/170 |
| 3,278,187 | A | * | 10/1966 | Sinden | ...................... A63F 7/02 273/118 R |
| 3,388,483 | A | * | 6/1968 | Weisbecker | ......... G09B 23/186 434/118 |
| 3,592,471 | A | * | 7/1971 | Swimmer | ................. A63F 9/00 273/120 R |
| 3,638,945 | A | * | 2/1972 | Breslow | .................... A63F 7/02 273/412 |

(Continued)

Primary Examiner — Raleigh W Chiu

(57) ABSTRACT

A game and a method for making it, according to certain disclosed embodiments, may include a playfield for allowing a rollable device for moving along its surface. Playfield guides may direct the rollable device along a path of travel. Three or more target goals on the playfield may receive the rollable device as its final destination. Decision making devices mounted movably on the playfield may adjust manually selectively the path of travel, and each have an entrance structure and two or more exit structures. Decision making device guides direct the rollable device from the entrances to selected ones of the exits. Wherein the rollable device moves along a selected path of travel including user selected entrances and user selected exits of a series of decision making devices to a user selected target goal.

17 Claims, 12 Drawing Sheets

(56) References Cited

U.S. PATENT DOCUMENTS

| | | | | |
|---|---|---|---|---|
| 3,807,736 A | * | 4/1974 | Goldfarb | A63F 7/0076 |
| | | | | 273/122 R |
| 3,994,076 A | * | 11/1976 | Bertman | G09B 23/02 |
| | | | | 434/189 |
| 4,055,344 A | * | 10/1977 | Soucie | A63F 7/02 |
| | | | | 273/110 |
| 4,468,031 A | * | 8/1984 | Barlow | A63F 9/14 |
| | | | | 273/110 |
| 4,474,558 A | * | 10/1984 | Quercetti | G09B 19/02 |
| | | | | 434/189 |
| 4,828,264 A | * | 5/1989 | Rutigliano | A63F 7/044 |
| | | | | 273/121 B |
| 5,016,879 A | * | 5/1991 | Parker | A63F 7/022 |
| | | | | 273/121 B |
| 5,301,942 A | * | 4/1994 | Lacrosse | A63F 7/02 |
| | | | | 273/138.3 |
| 5,332,216 A | * | 7/1994 | Whipple | A63F 7/02 |
| | | | | 273/109 |
| 5,738,355 A | * | 4/1998 | Gibson | A63F 7/045 |
| | | | | 273/457 |
| 6,010,130 A | * | 1/2000 | Schreiber | A63F 7/02 |
| | | | | 273/118 R |
| 2018/0366027 A1 | * | 12/2018 | Boswell | A63F 7/02 |
| 2020/0215423 A1 | * | 7/2020 | Hauck | A63F 9/0098 |

\* cited by examiner

EDUCATIONAL GAME AND METHOD OF MAKING SAME

RELATED PATENT APPLICATION

The present U.S. nonprovisional patent application claims the benefit to U.S. provisional patent application Ser. No. 62/789,109, filed Jan. 7, 2019, entitled EDUCATIONAL GAME, and incorporates it herein by reference in its entirety.

FIELD OF THE INVENTION

The present invention relates to educational games and methods of making them. More particularly, the invention relates in general to a playfield incorporating guides and rollable devices or the like to move along various paths of travel along the playfield.

BACKGROUND ART

Electronic toys and games are numerous and well known. However, the article, "Selecting Appropriate Toys for Young Children in the Digital Era," by Healey A, Mendelsohn A, AAP COUNCIL ON EARLY CHILDHOOD, *Pediatrics.* 019;143(1):e25183348, gives compelling arguments supporting traditional (non-electronic) toys as advantageous over electronic toys. This article, portions of which are excerpted below, identifies problems associated with electronic toys and supports the superior alternative of more traditional non-electronic toys.

For example, the article contends, "Problem solving through play with the 'traditional favorites' such as blocks and puzzles, can support fine motor skills and language and cognitive development and predicts both spatial and early mathematics skills. . . . Electronic toys by themselves will not provide children with the interaction and parental engagement that are critical for the healthy development. . . . Toys can play an especially important role in the promotion of learning and discovery in 'guided play,' in which children take the lead, but caregivers support their exploration in the context of learning goals. . . . In general, toys that facilitate imaginative play and problem solving are most likely to enable such engagement by caregivers, whereas toys that are electronically based (whether traditional or media based) are less likely to do so. . . . Some toys have the ability to 'grow' with the child, in that they can be used differently as children advance developmentally."

Mechanical toys and games have been developed involving ramps and balls. Some mechanical devices allow construction of 2-dimensional or 3-dimensional marble raceways, often termed "marble runs." An example of a 2-dimensional marble run is the "Marble Run 2D" from https://bernhard-burkard.com/portfolio/plama-marble-run-2d/. Quoting from this site, the game "allows the user to create an infinite variety of paths on a magnetic surface." A disadvantage of this toy is that it requires the user to construct a series of ramps before launching a ball to even operate the toy. Because this toy is not usable "out of the box", a beginning or inexperienced user may be frustrated by inappropriately placing ramp elements, causing the ball to drop off of the playfield instead of terminating at the desired location. Another disadvantage is that it does not encourage and appears not intended for multi-player or competitive play, and thus is less likely to engender enthusiasm for repeated play and more likely become boring. An additional disadvantage is that it is played in only a single mode. The single mode is for the user to assemble the ramps on the playfield and then attempting to cause the selectively positioned ramps to prevent the ball from rolling off the bottom of the playfield. Once the game is mastered, there is no technique for enhancing the game to add additional elements of difficulty or strategy, beyond buying more sets to construct larger systems of ramps. Regardless of how a player constructs the ramps, the goal is always simply the same, to reach a single destination point.

An example of a 3-D marble run is the "Ball Track (Marble Run) Large Basic Set," available at https://www.habausa.com/shop/blocks/marble-run/. From this web site, the set is described as follows: "Hardwood blocks with grooves and holes are combined in a variety of ways with the end result of 6 marbles ringing the bell to signal success." This 3-D building set and those like it share the same disadvantages of the 2-D sets. Amongst other things, the 3-D building sets do not operate out of the box, they provide little or no educational training, they do not encourage multi-player or competitive play, they operate in only a single mode, offering only a single desired destination for the downward rolling ball, and they are not expandable to add elements of difficulty or strategy. The 3-D versions add to these drawbacks by adding the complexity of requiring the assembly by the user of a 3-dimensional structure, which is more complex and less stable than a 2-dimensional structure. Like the 2-D versions, the 3-D versions must require extensive assembly by the user before launching a ball. Other 3-D marble runs are constructed of plastic instead of wood, but they differ only in the construction method, sharing the same attributes and disadvantages of the "Ball Track (Marble Run)."

Other ball and ramp games attempt to be educational by serving to illustrate aspects of mathematics or computer operation in a mechanical manner. An example is the "Turing Tumble" game, described at https://www.youtube.com/watch?v=iSjx6uh8MFg. To quote the inventor from this site, "Turing Tumble is a new type of game where kids build mechanical computers powered by marbles to solve logic puzzles." A Turing Tumble comprises an inclined playfield ("gameboard") containing many posts, onto which plastic pieces may be placed in different combinations.

A disadvantage of this game is that it requires the user to place a series of plastic pieces on the gameboard to solve a "puzzle" before launching a ball to operate the game. Because this toy does not operate "out of the box", a beginning user may well be frustrated by inappropriately placing plastic elements, which causes the ball to drop off of the playfield prematurely instead of terminating at the desired two locations. Another disadvantage is that it does not encourage multi-player or competitive play. An additional disadvantage is that it is played in only a single mode, in which once the game is mastered, it is not capable for enhancing the game to add additional elements of difficulty or strategy, beyond solving additional logic puzzles. Regardless of how a player places the plastic pieces on the gameboard, the goal is always the same, to reach one of two destinations only.

Therefore, it would be very desirable to have a totally or substantially mechanical educational game which may promote tactile development, group interaction, and imaginative play and problem solving. Such an educational game should be attractive to a wide range of ages such as from toddlers on up in order to encourage creativity. To appeal to young or inexperienced users, such a game may be operable in a simple manner, out of the box, without requiring a complex and difficult to understand interaction with the game. Such a game may be able to offer multiple modes of play, which may include increasing levels of difficulty to challenge players who may have mastered the game at its simplest and thereby maintain interest in the game. Such a game may be customizable. Furthermore, the game should not only be easy to manipulate manually, but also at the same time help to improve manual dexterity of the user.

BRIEF DESCRIPTION OF THE DRAWINGS

The features of this invention and the manner of attaining them will become apparent, and the invention itself will be best understood by reference to the following description of certain embodiments of the invention taken in conjunction with the accompanying drawings, wherein.

NOTE: Cards are shown enlarged compared to FIG. 1, but the rest of the game is shown to the same size as FIG. 1. Also, nothing is "exploded" in FIG. 6.

Figure 1:
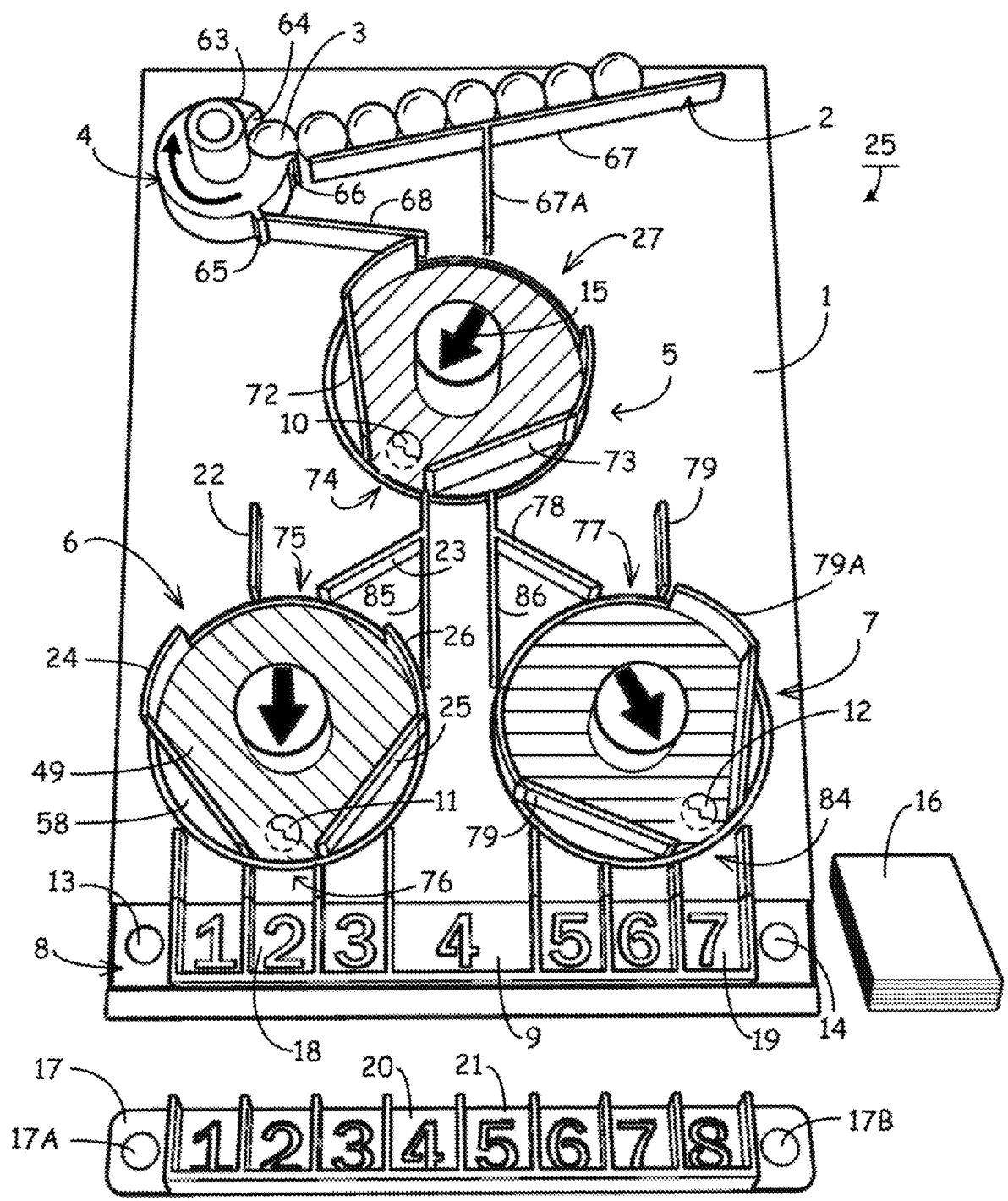
FIG. 1 depicts a front pictorial view of a game constructed according to an embodiment.
Figure 15:
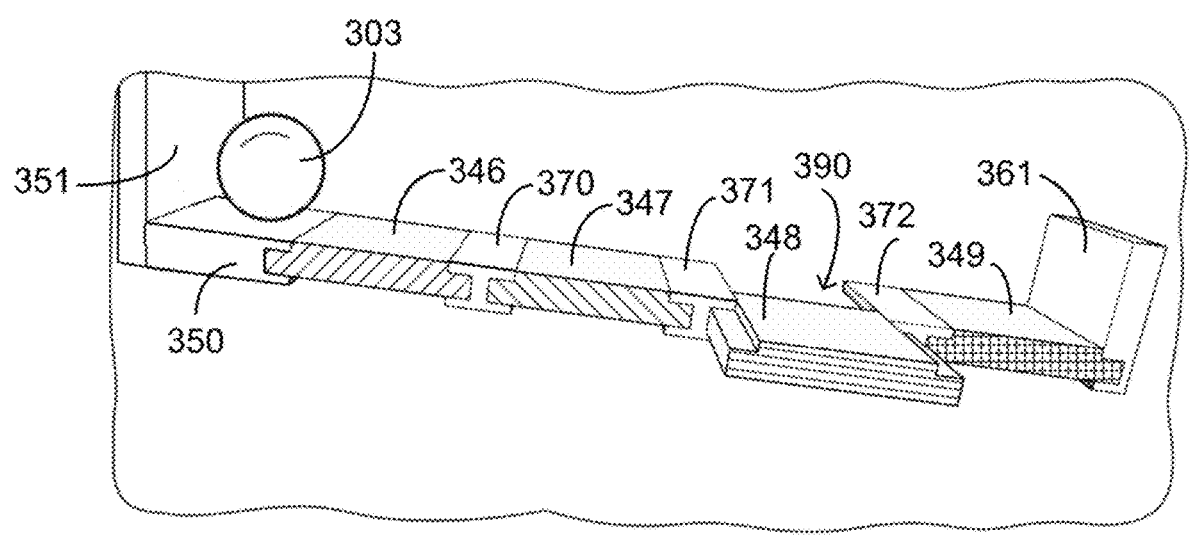
Figure 5:
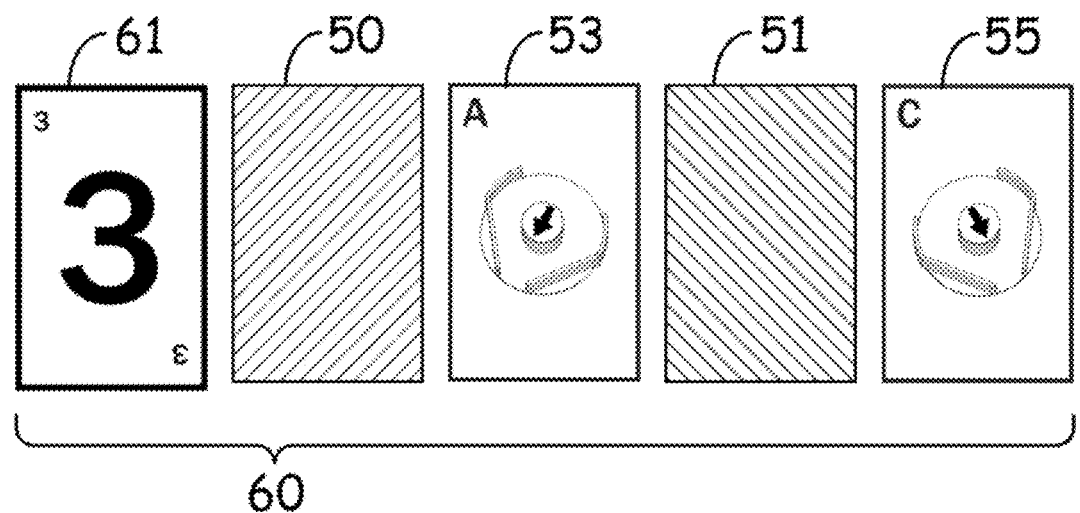
Figure 6:
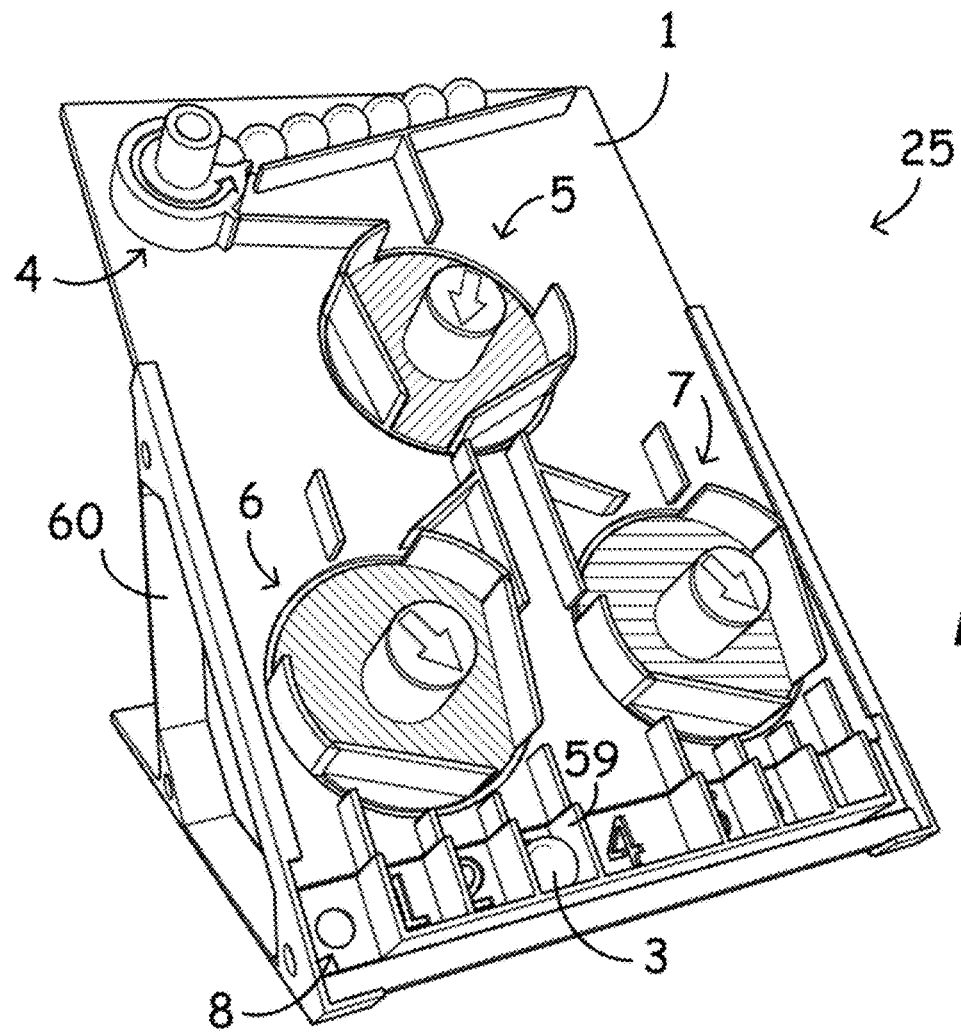
Figure 6:
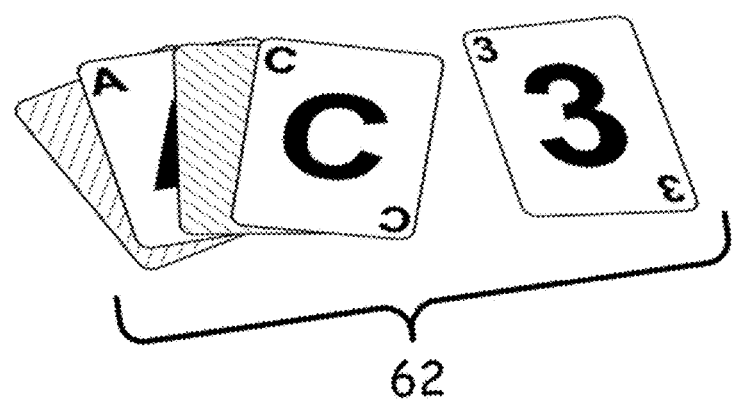
Figure 7:
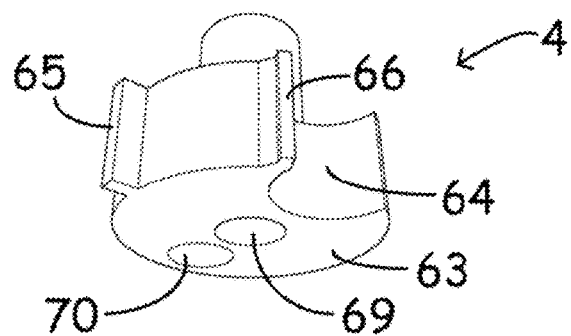
Figure 9:
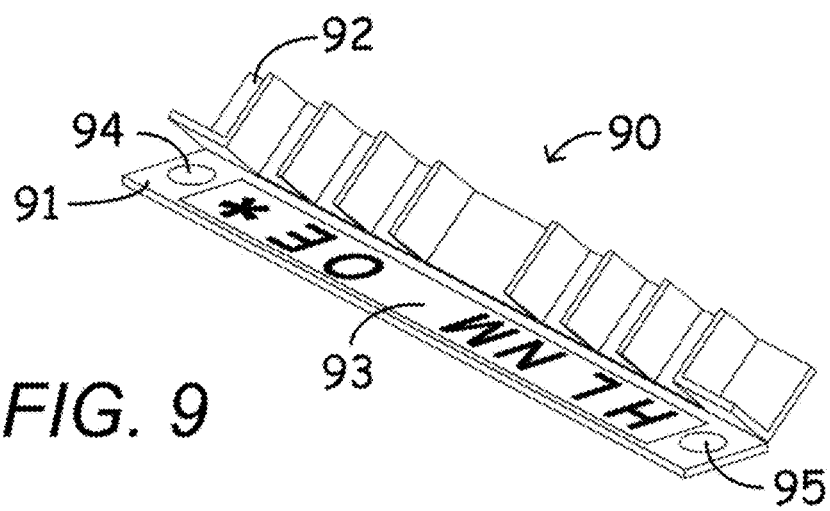
Figure 11:
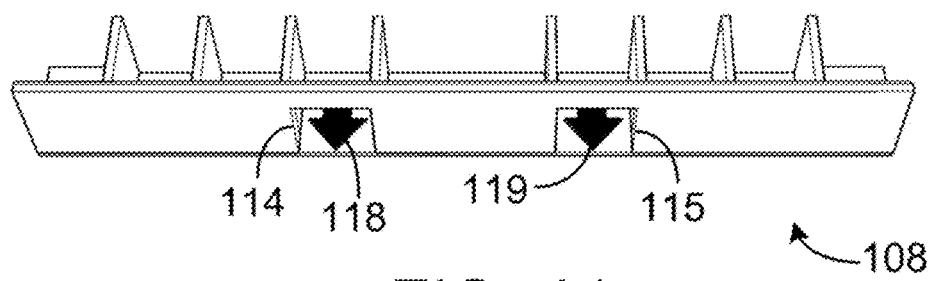
Figure 8:
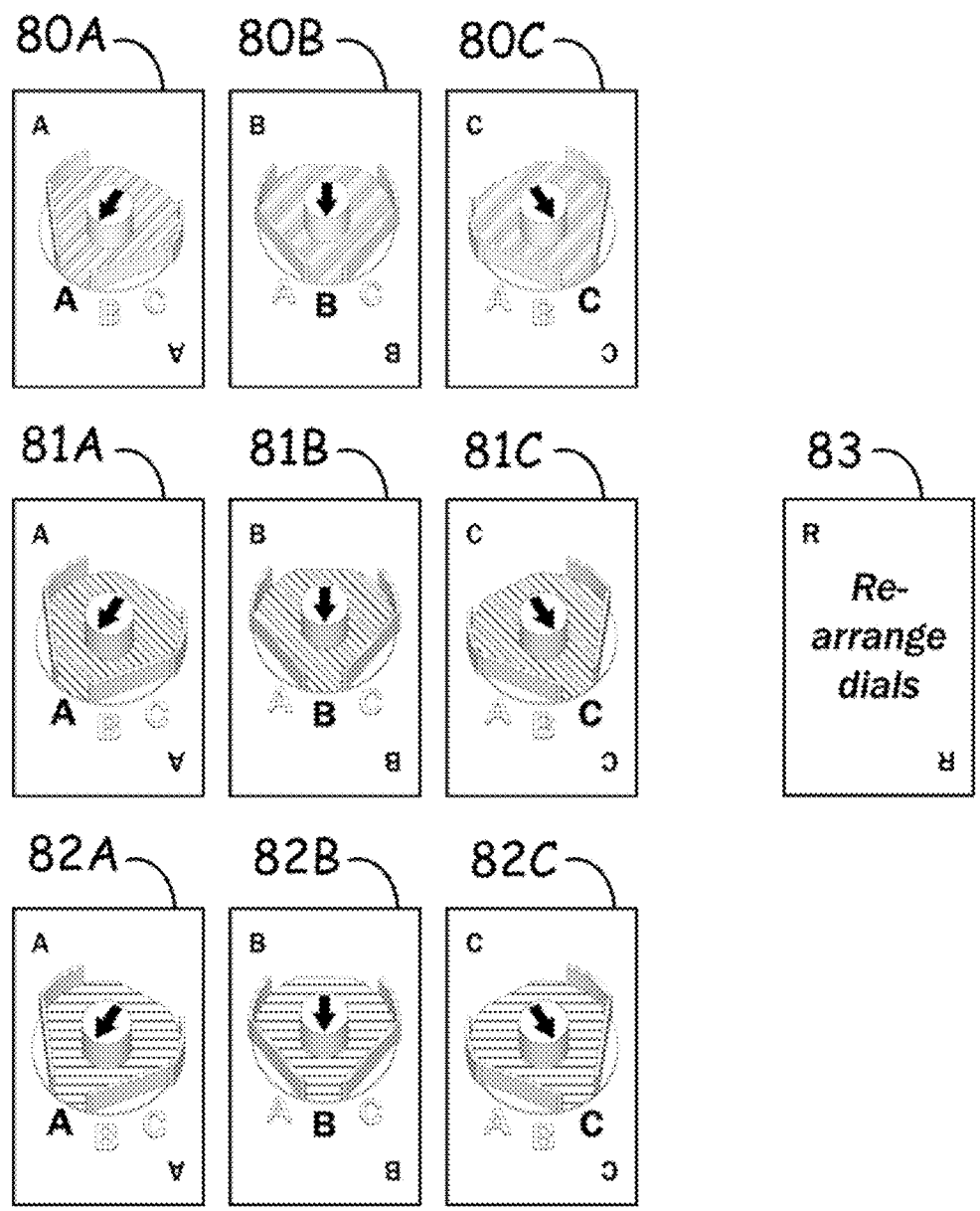
Figure 10:
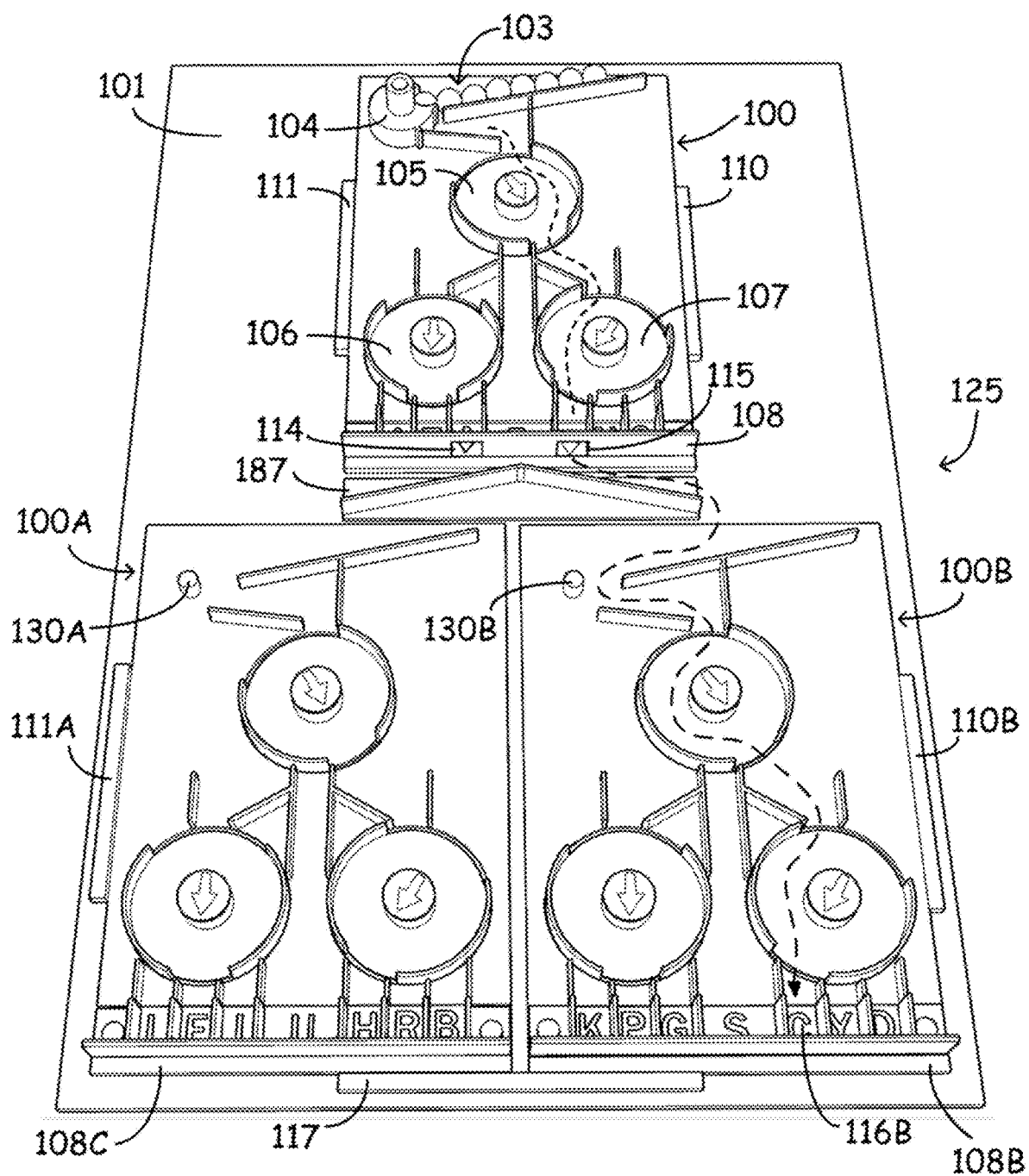
Figure 12:
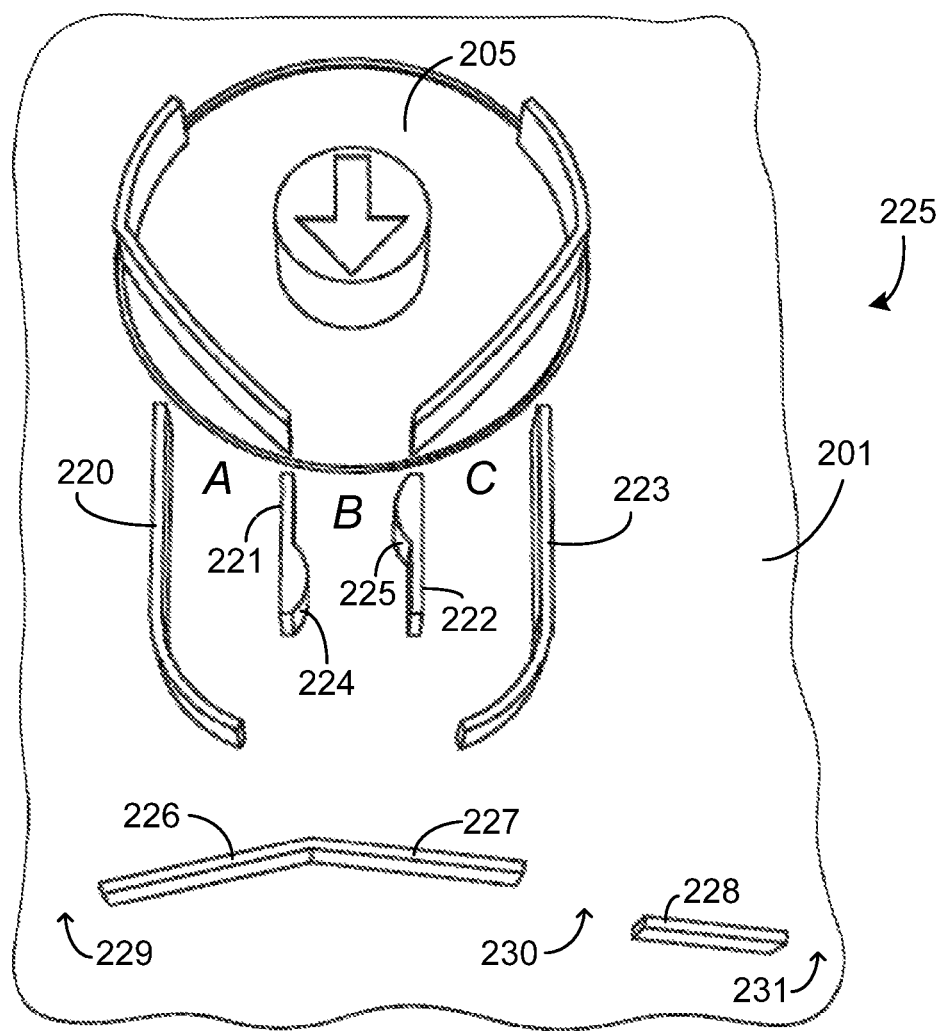
Figure 13:
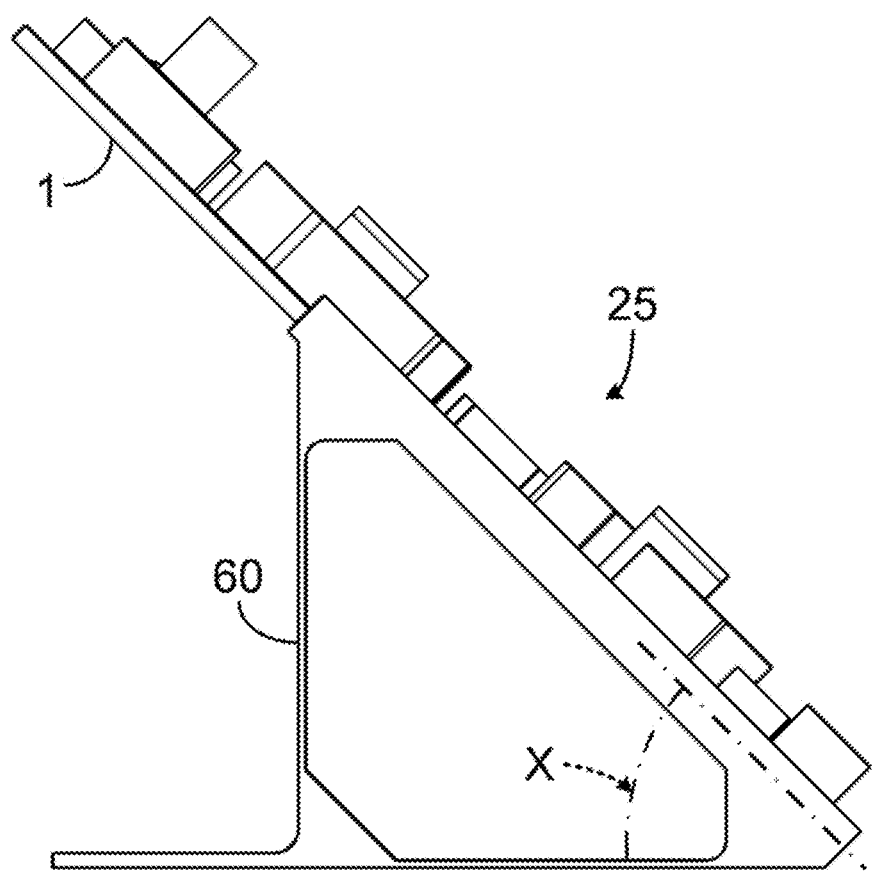
Figure 14:
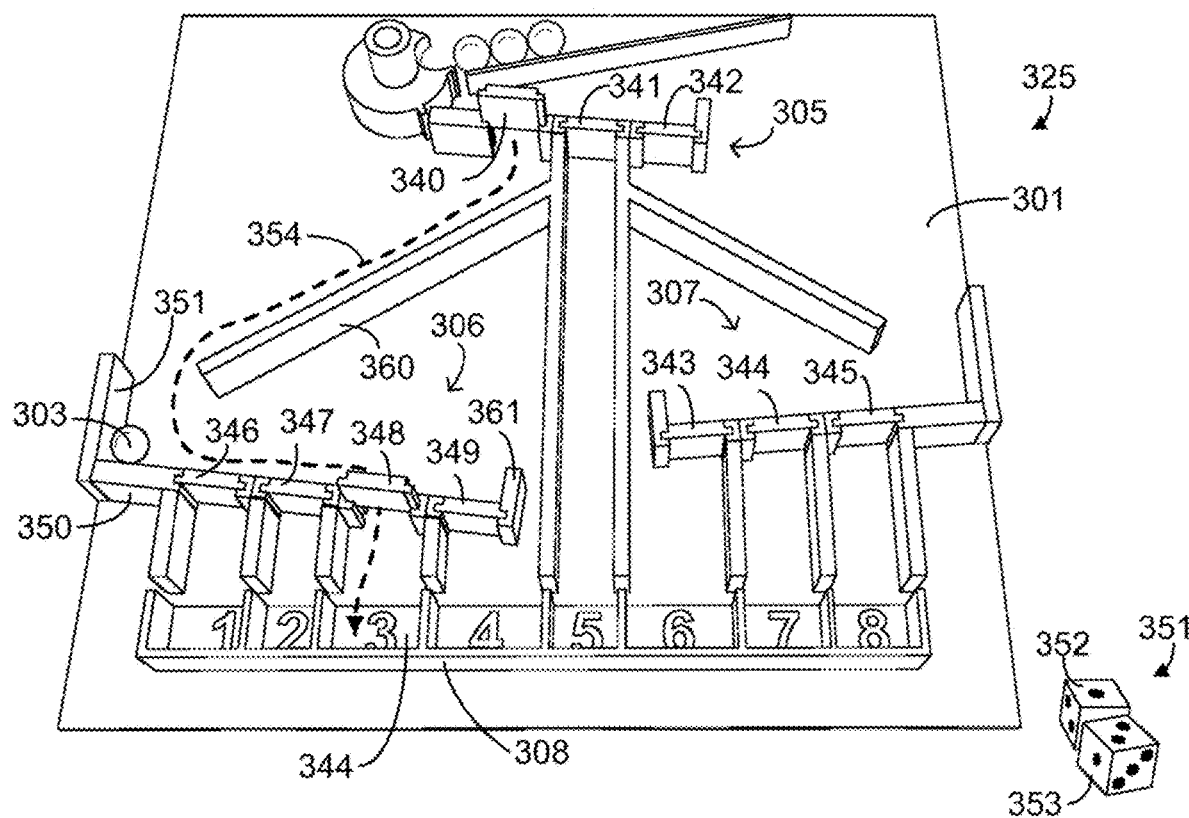
Figure 16:
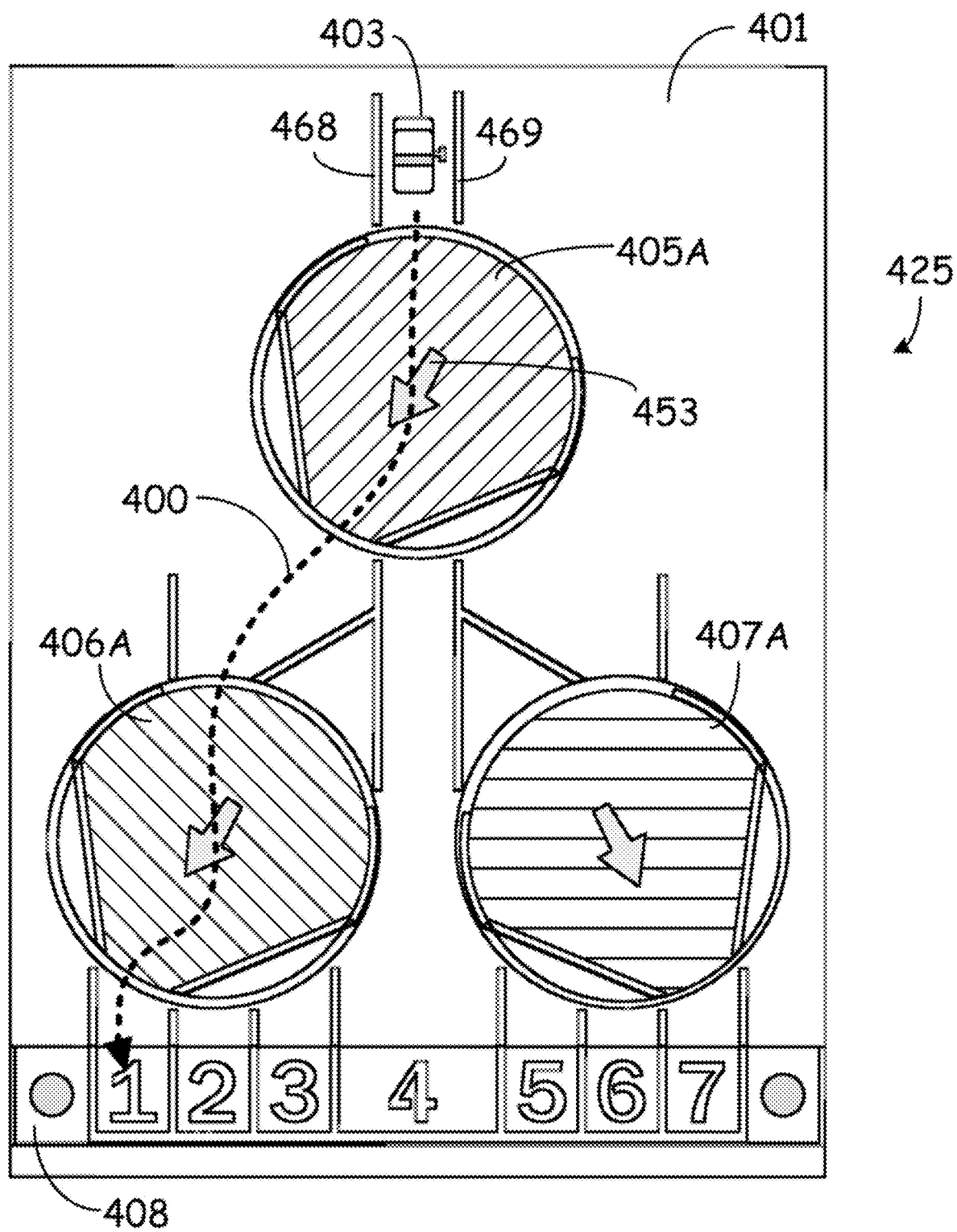

FIG. 6 depicts a pictorial view of the game of FIG. 1, illustrating the completion of the descent of a rollable device such as a ball in a selected target goal indicated by an enlarged view of a certain successful playing card meld of FIG. 5;

FIG. 7 depicts an enlarged pictorial view of a ball release dial;

FIG. 8 depicts an enlarged pictorial view of an alternative playing card format of the game of FIG. 1;

FIG. 9 depicts an enlarged pictorial view of an alternate ball target goal of the game of FIG. 1;

FIG. 10 depicts a pictorial view of a game constructed according to another embodiment;

FIG. 11 is an enlarged detail pictorial view of a ball gate of FIG. 10;

FIG. 12 depicts a fragmentary pictorial view of an alternative arrangement of guides of a portion of the game of FIG. 1;

FIG. 13 depicts an enlarged side elevational view of the game of FIG. 1;

FIG. 14 is a pictorial view of a game constructed according to a further embodiment;

FIG. 15 is an enlarged pictorial view of a decision making device of the game of FIG. 14; and FIG. 16 is a pictorial view of a game constructed according to yet another alternative embodiment.

DETAILED DESCRIPTION OF CERTAIN EMBODIMENTS

It will be readily understood that the components of the embodiments as generally described and illustrated in the drawings herein, could be arranged and designed in a wide variety of different configurations. Thus, the following more detailed description of the embodiments of the game, components and methods of making the game, as represented in the drawings, is not intended to limit the scope of the invention, as claimed, but is merely representative of certain embodiments.

A game and a method for making it, according to certain disclosed embodiments, may include a playfield for allowing a rollable device for moving along its surface. Playfield guides may direct the rollable device along a path of travel. Three or more target goals on the playfield may receive the rollable device as its final destination. Decision making devices mounted movably on the playfield may adjust manually selectively the path of travel, and each have an entrance structure and two or more exit structures. Decision making device guides direct the rollable device from the entrances to selected ones of the exits. Wherein the rollable device moves along a selected path of travel including user selected entrances and user selected exits of a series of decision making devices to a user selected target goal.

According to another embodiment, a random path selecting device such, for example, as a deck of playing cards, a pair of dice, or others, may be utilized in the game by indicating a given path of travel for the rollable device along the selected path of travel.

A further embodiment relates to the playfield which may be angularly inclined at an angle relative to the horizontal of between about 30° and about 60°. More particularly, the angle may be between about 40° and about 50°. Still more particularly, the angle may be about 45°. When the playfields are so inclined, the playfield guides are ramps. In other embodiments, the disposition may be substantially horizontal.

Further embodiments may relate to the rollable device which may be a ball, a miniature vehicle, or other suitable device for rolling along the path of travel on the playfield.

Still further embodiments may relate to the use of removably attached playfields on the playfield base to achieve an advanced form of play of the game.

According to another embodiment, the game playfield may be disposed in a horizontal disposition and the playfield guides may be fences.

Yet another embodiment may relate to removably attaching the target goals to the playfield, and providing alternate removably detachable target goals to help vary the play of the game.

The target goals, according to various embodiments, may be, without limitation, raised well structures when the rollable devices are balls, and may be garage structures when the rollable devices are miniature vehicles.

According to further embodiments, a first plurality of magnets may attach the target goals removably to the play field, and a second plurality of magnets may serve as detents for the decision making devices. A third plurality of magnets may enable a rollable device dispenser to serve as a reset.

Still further embodiments may relate to the decision making devices being arranged in hierarchical ranks on the playfield to provide educational benefits to the user. The decision making devices each may include a turntable rotatably mounted on the playfield between the two or more exit structures.

According to still other embodiments, the decision making devices may include a series of manual user operable gates.

According to an embodiment, a game including an inclined playfield containing ramps and decision-making devices such as a dial may alter the course of a rollable device such as a ball as it gravitationally descends. A player manually manipulates each dial to determine a specific path the ball will take as it gravitationally descends. At the bottom of the playfield there is a ball tray containing a plurality of numbered goals such as wells to serve as destination targets for the ball to drop into as it completes its descent. A random path selecting device such as a deck of cards may be employed that identify each of the dials, the setting of each dial, and numbers corresponding to the numbered well targets. Many play variations are possible due to the optional coupling of the cards with mechanical operation of the playfield. The game encourages group interaction, logical thinking, and creativity in customizing its game play in a flexible manner to appeal to many age groups. The use of manually operable dials encourages a younger player to operate readily the game as well as helping a young player to gain manual dexterity.

Various embodiments may include a random path selecting device such as a deck of cards that identify each of a set of decision making devices, the setting of each one, and numbers for other indicia corresponding to numbered target goals. Many play variations may be possible due to the optional coupling of the cards with mechanical operation of a playfield. Certain embodiments may encourage group interaction, logical thinking, and creativity in customizing the game in a flexible manner to appeal to many different age groups.

Referring now to the drawings, in FIG. 1-7 and 13, there is shown a pictorial view of an educational game 25 which is constructed according to an embodiment and which may be constructed with mechanical components with no electrical components. The game 25 may include an inclined playfield 1 and an optional random path selecting device such as a deck 16 of playing cards. All elements in FIG. 1, excepting a random path selecting device in the form of a card deck 16, may be conveniently termed a ball machine. Situated on playfield 1 may be a series of playfield guides such as raised ramps including a ball supporting ramp 2. A plurality of rollable devices such as ball 3, a ball release device or mechanism 4, three decision making devices such as dials 5, 6 and 7, and target goals such as a ball tray generally indicated at 8 containing a plurality of numbered wells, for example 9, 18 and 19, into which a ball 3 may terminate its gravitational decent along a given user selected path of travel. Alternative optional ball tray 91 as shown in FIG. 9, or others, may replace ball tray 8 for variation in game play. The decision making dials may be similar in structure but differentiated in some manner, in this instance the colors red for dial 5, green for dial 6 and blue for dial 7. In the drawings, the color red is indicated by diagonal-left crosshatching, the color green is indicated by diagonal-right crosshatching, and the color blue is indicated by horizontal crosshatching.

Although the FIG. 1 embodiment implements the decision making devices as dials, other physical implementations are possible if they provide the function of a user selecting one of multiple different exit paths through decision-making devices to help guide a ball rolling along a portion of a user desired path of travel under the force of gravity or other means for propelling the rollable device toward a user selected goal. Although the FIG. 1 ball machine employs three manually rotatable dials and seven or eight numbered target wells on ball trays 8 and 91 respectively, other combinations of decision making devices, goals, and guides are possible.

In more detail, still referring to the game 25, each dial may have a plurality of settings such as one of three settings which correspond to three possible ball trajectories as the ball exits the dial. Disposed on the face of the rotatable portion of the dials 5, 6 and 7, are arrow indicia such as arrow indicia 15 on dial 5, for indicating the direction the ball will take as it exits the dial. As shown in FIG. 1, dial 5 is set manually to an angular position such that a ball entering the dial will exit the dial in a leftward direction through a lower exit structure generally indicated at 74 defined by dial guides 72 and 73, causing a downwardly rolling ball to be guided by ramps 22 and 23 into an entrance structure 75 defined by the upper ends of dial guides 24 and 26 on dial 6. Dial 6 is user manually set as shown in FIG. 1 such that a ball entering the dial 6 exits the dial in a straight-down direction through a lower exit structure 76 defined by the dial guides 24 and 25, causing the ball to come to rest in target well 18. Finally, dial 7 is set by the user such that a ball entering the dial exits the dial 7 in a rightward direction, causing it to come to rest in target goal well 19.

Each dial 5, 6, 7 can be set manually in a predetermined rotatable angular position prior to the release of a ball 3 from the ball release device 4 to any of three positions. A player may observe that each individual target well is reachable by a ball, but only with a particular combination of dial settings. Interestingly, not all dials must participate for a given target. For example in FIG. 1 the setting of the blue dial 7 is irrelevant because the blue dial is not entered due to the red dial 5 setting which directs the ball to the green dial 6. Also, if the red dial 5 is set to its down position, the target well 9 is reached directly, independently of the settings of dials 6 and 7. Although the mechanical educational game depicted in FIG. 1 includes three decision making dials, any number of dials may be employed in a given design. Similarly, the number of dial settings may be two or more, and is not limited to three.

Figure 2:
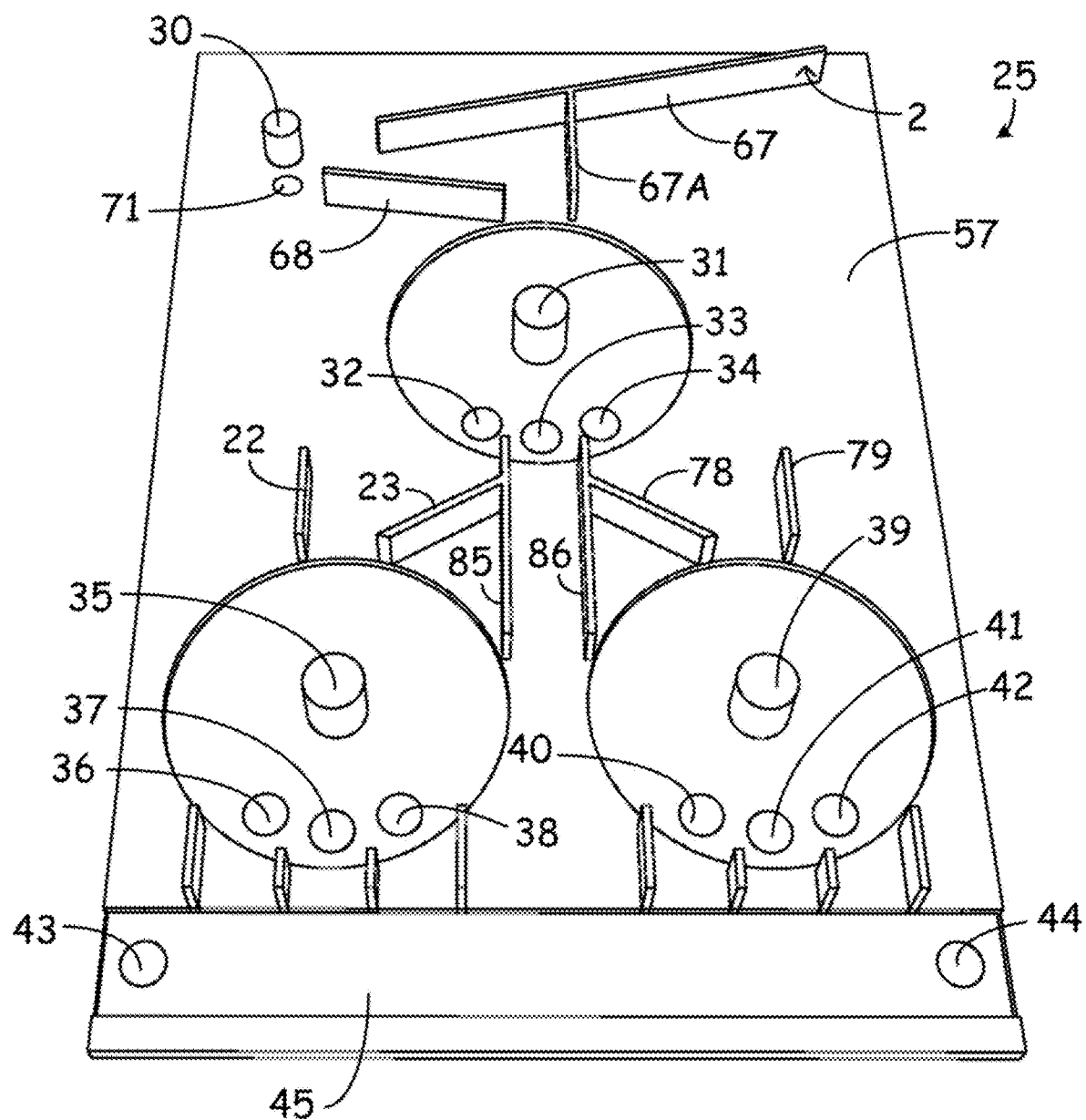
FIG. 2 depicts a pictorial view of an inclined playfield of the game of FIG. 1 showing the inclined playfield base.

Referring now to FIGS. 1 and 2, each dial 5, 6, 7 has a detent action to ensure that its exit aligns properly with the selected individual target goal such as an individual target well, and to provide a tactile click as the dial is rotated to each position. Many different mechanical means may provide a detent, and in the game 25 the detent is created using small permanent magnets 10, 11 and 12 embedded in respective dials 5, 6 and 7, which magnets are mutually attracted to one of three magnets embedded in the stationary playfield base 57 (FIG. 2) for each one of the dials 5, 6 and 7. Each one of the playfield magnets 10, 11 and 12 may be disposed at one of the three desired dial positions.

A pair of permanent magnets 13 and 14 provide a removable attachment which is a temporary attachment means for either end of elongated ball tray 8, to enable easy removal and replacement of the ball tray to enable different configurations of ball wells such as in optional alternative ball tray 17 having a pair of attachment permanent magnets 17A and 17B to serve the same purpose as the magnets 13 and 14 of the ball tray 8 respectively.

Turning now to FIG. 13 there is shown a side elevational view of the game 25 (FIG. 1) mounted in a support bracket 60 in order to give the required inclination angle. The playfield 1 may have an inclination angle X degrees from the horizontal as in FIG. 13. According to an embodiment, a critical range of inclination angle X is about 30° to about 60° from the horizontal. A more preferred range of angle X is about 40° to about 50°. The most preferred angle X is about 45°. If the angle X is too small, the rollable device may not roll at an adequate speed to reach the bottom goal ball tray. If the angle X is too large, the velocity may be too great as to cause the rollable device to fall off of the playfield or otherwise not perform as intended.

The deck of cards 16 may include cards that specify a ball target well by indicia numbers 1-7 of FIG. 1, a particular dial selector RED 5, GREEN 6, or BLUE 7 and a dial position such for example as "A" corresponding to the left exit position, "B" corresponding to the down exit position, and "C" corresponding to the right exit position. These letters may not be displayed on the playfield to help the player to make the associations of dial positions to the letters "A", "B", "C" illustrated on one or more of the individual cards for providing a mental exercise to encourage memory and learning, especially in very young children. Due to the correspondence of the cards to the settings of the physical dials and ball well targets, the use of card play as a prelude to setting the dials and releasing a ball to judge the outcome enables many different variations of the game play. Three examples of game play illustrate the flexibility and potential for innovation provided by the game.

In a first game play example a parent or teacher may work with a young child player, for example 3 years of age. The parent or teacher names a goal target well number and asks the child to set the three decision making dials 5, 6 and 7 to try to cause the ball launched by the ball release mechanism 4 to reach the named target well. The parent or teacher might say, "Make the ball fall into well number five," pointing out the well or by saying its number to promote learning numbers. The player sets the dials, then turns ball release mechanism 4 clockwise to release one ball. If the ball terminates its gravitational descent in the correct goal target well of ball tray 8, the parent or teacher expresses delight. If the ball falls into a different goal target well, the parent or the teacher now has the chance to discuss the dial settings and guide the child to the correct settings. Even if there may be a brief period of confusion, once learned, many small children may well master it thereafter.

In a second game play example, the deck 16 includes seven number cards, bearing indicia numbers 1 to 7, such as card 61 shown in FIG. 5 and bearing indicia number "3." These seven cards are separated from the deck 16, shuffled, and placed face down in a pile. For each turn a player turns over one of the seven number cards specifying the goal target well and proceeds to set the dials in attempts to reach the indicated numbered well. The goal is to populate each numbered goal target well exactly once. Due to the random effect of shuffling the cards, the sequence of goal target well numbers is not always the same. This version has the benefit of also supporting unsupervised play, although a companion may be valuable to supply encouragement and advice.

In a third and more advanced game play example, the entire deck 16 is shuffled and each of multiple number of players is dealt a hand. For example, ten cards are dealt and each player lays their cards face up in front of him or her. The goal is to accumulate a combination of cards (a meld) that describes a successful traversal of a ball over playfield 1. For example, a meld of the five cards:
RED, A, GREEN, B, 2
describes as shown in FIG. 1 the successful descent of a ball into well 18 marked by the number indicia "2", by specifying, "To reach well two, set the RED dial to A and the GREEN dial to B." For every turn a player may do one of three things:
  A. Place a face up number card near the bottom of the playfield to serve as the common target well for all players. This occludes and nullifies any number card previously placed there.
  B. Discard one card and replace it with one from the deck 16, or
  C. Play a group of cards (a meld) by placing them in order near the playfield 1, setting the dials to the positions dictated by the card combination, and then releasing one ball to determine the outcome. If the ball 3 drops into the desired well, the player removes the ball and keeps it. If not, the player removes it from the well and replenishes the ball supply feeding the release mechanism 4. Extra balls are added as needed as the game progresses.

The first player to accumulate a certain number of balls, for example five, wins the game. At the end of a turn the player draws enough cards in order to replenish the hand to its starting number. Because all player cards are visible, players can make strategic plays using their number cards. A player one card away from a successful meld may be foiled by another player who, realizing this, changes the goal by playing a differing number card, thereby changing the target goal well common to all players.

Alternative ball tray 17 may replace ball tray 8 to change the nature of the goal target wells. The ball trays are held in place by the magnets 13 and 14 which facilitate easy removal and replacement of ball trays. Ball tray 17 has the novel feature that a ball may reach either target well 20 or target well 21 with approximately the same probability when the red dial 5 is set to its direct down exit position B. When the ball tray 17 is attached at the bottom of the playfield 1 in place of the ball tray 8, the wells 20 and 21 are disposed side-by-side and aligned directly with the B setting of dial 5. This introduces a degree of randomness for the RED-B setting with which players may choose to try their luck with or to avoid. The advantage of the RED-B setting is that it requires only two cards in a meld instead of the four required to reach the other target wells and therefore the player has a better chance of drawing to this meld. The disadvantage is that which of the wells, 20 or 21, is reached by the RED-B dial setting can be determined by chance.

Although two variations in ball trays are described, other variations are possible due to the detachable nature of the goal ball trays 8 and 17.

Referring now to the game 25 shown in FIGS. 1 and 2, with the top portion of the playfield removed, a playfield base 57 of the playfield 1 is shown. The playfield and its components may be fabricated by 3D printing a design using a 3D printer such as the Prusa i3 Mark 2. The design may be created on a personal computer using a Computer Aided Design (CAD) software package such as SketchUp, currently available free for download on the Internet from www.sketchup.com. For volume production the components may be created using an injection mold process or other suitable process such as making the components from metal, wood or other materials.

In addition to the playfield guide ramps generally indicated at 2, the base 57 includes other playfield features of the various ball machine components. Post 30 receives rotatably the ball release mechanism 4 (FIG. 1), post 31 receives rotatably the dial 5 (FIG. 1), post 35 receives rotatably the dial 6 (FIG. 1), post 39 receives rotatably the dial 7 (FIG. 1), and recessed area 45 receives the goal ball trays such as trays 8 or 17. The base permanent magnets embedded in the playfield base may be secured using a suitable method such as by press fitting or by using a suitable adhesive or other. These base magnets have opposing polarity to the mating dial magnets 10, 11 and 12 so that when a dial is turned to one of its three positions, one of three opposing base magnets attract to pull or urge the dial magnet to the desired position and hold it there removably. Magnet 32 is disposed to correspond to the left (A) setting of dial 5, magnet 33 is disposed to correspond to the down (B) setting of dial 5, and magnet 34 is disposed to correspond to the right (C) setting of dial 5. This placement implements the detent action as the dial magnet 10 (FIG. 1) in red dial 5 is attracted to one of the three positions when being positioned directly over one of the three base magnets. Similarly magnet 36 is disposed to correspond to the left (A) setting of dial 6, magnet 37 is disposed to correspond to the down (B) setting of dial 6, and magnet 38 is disposed to correspond to the right (C) setting of dial 6. This placement implements the detent action as the dial magnet 11 (FIG. 1) in green dial 6 is attracted to one of the three positions by being positioned directly over one of the three base magnets. Magnet 40 is positioned to correspond to the left (A) setting of dial 7, magnet 41 is positioned to correspond to the down (B) setting of dial 7, and magnet 42 is positioned to correspond to the right (C) setting of dial 7. This placement implements the detent action as the dial magnet 12 (FIG. 1) in blue dial 7 is attracted to one of the three positions by being directly over one of the three base magnets. Magnets 43 and 44 are positioned to hold in place the ball tray 8 or 17 by forming mutual attraction with magnets 13 and 14, respectively (FIG. 1).

Figure 3:
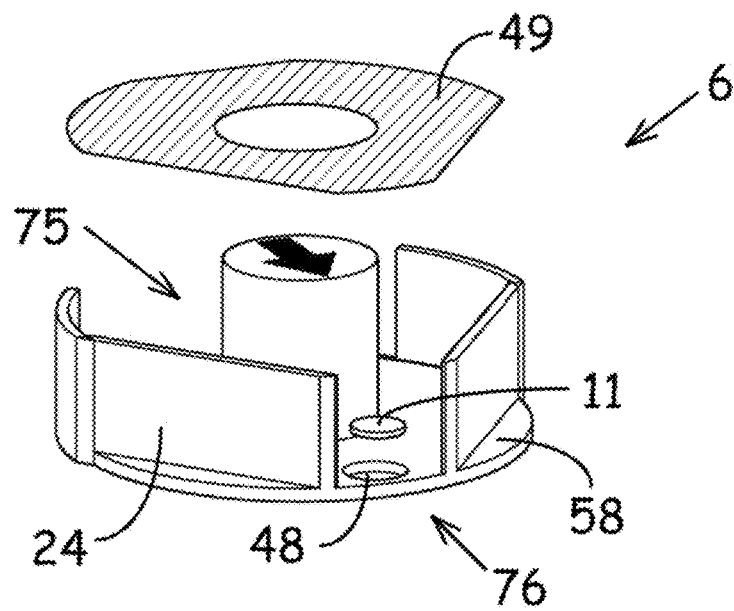
FIG. 3 depicts an exploded pictorial view of a decision making dial.

Referring now to FIG. 3, there is shown an exploded pictorial view of the decision making device dial 6, the other two dials 5 and 7 being similarly constructed and thus will not be described in greater detail. This component, as well as the goal ball trays 8 and 17 may be designed and 3D printed using the SketchUp and Prusa technologies previously mentioned. Each dial face includes a color indicating flat insert 49 having a distinctive color indicia and being fixed over the dial, for example by use of a suitable adhesive or other suitable processes.

The dial 6 includes a circular rotatable plate 58 to enable the rollable device such as the ball 3 to roll along the surface of the color indicating flat insert 49 attached to the top surface of the plate 58. As a component distinct from the dial body, insert 49 may be independently printed and therefore can have a different color than the dial body. The color indicia bearing insert 49 may for example be chosen as RED for dial 5 (as shown), GREEN for dial 6, and BLUE for dial 7.

The permanent magnet 11 is fixed within recess 48 in the plate 58 to implement the detent action by cooperating separately with the three playfield magnets 33, 37 and 38 of FIG. 2 as previously described. The recess 48 may be slightly larger, such as about 5 to about 10 percent larger, than the dial magnet 11 diameter and height. The magnet may not be fixed in place, but instead it may be permitted to move freely within the recess 48. It may be held in the recess by the overlying insert 49, which does not have adhesive applied to the region above the magnet to allow the magnet to move freely. The result of this arrangement is that the dial not only provides a satisfying detent action, it also produces an audible "click" as the dial is manually rotated to its three positions due to the unconstrained magnet 11 rattling around inside recess 48 as the dial is being rotated by the user.

With reference to FIGS. 1, 2 and 3, considering now an example of a selected path of travel of a rollable device such as ball 3 as it traverses between the ball release mechanism to a selected goal such as the well 18 designated with an indicia number "2." The path of travel extends from the ball release mechanism 4 downwardly along the playfield 1 between playfield guides 68 and a downwardly extending portion 67A of the guide ramp 67 and into an entrance structure generally indicated at 27 for the rotatable dial 5, which is disposed leftwardly in its position "A" (not shown). Upper ends of dial guides 72 and 73 define the entrance structure 27, and the lower ends thereof define exit structure 74.

The selected path of travel continues from exit structure 74 via playfield guides 22 and 23 into entrance structure 75 defined by upper ends of dial guides 24 and 26. The path continues downwardly between dial guides 24 and 26 and through exit structure 76 defined by the lower ends of dial guides 24 and 26. The dial 6 is shown disposed in its direct downwardly disposed position "B" (not shown) as selected by the user and aligned with the well 18 designated by number indicia "2."

Another path of travel not selected as shown in FIG. 1 is defined by a pair of parallel elongated directly downwardly extending guides 85 and 86 aligned with the position "B" (not shown) of the dial 5 when selected by the user to direct the rollable device 3 into goal well 9 designated with number indicia "4." This position bypasses completely both the dials 6 and 7.

A further path of travel not selected as shown in FIG. 1 includes a pair of playfield guides 78 and 79 extending from the exit structure 74 to guide downwardly a rolling ball when dial 5 is rotated by the user to the rightward position "C" (not shown) to direct the ball into the entrance structure 77 on dial 7 defined by dial guides 79 and 79A. Exit structure 84 defined by dial guides 79 and 79A on dial 7 are aligned with goal well 19 designated with number indicia "7" which receives a downwardly rolling ball.

Thus, as noted previously, dial 6 exit structure 76 may be aligned selectively with one of goals "1", "2", or "3." Dial 7 may be aligned selectively with one of goals "5", "6" or "7." The upper dial 5 may be aligned selectively with one of dials 6 or 7, or alternatively to goal "4."

Figure 4:
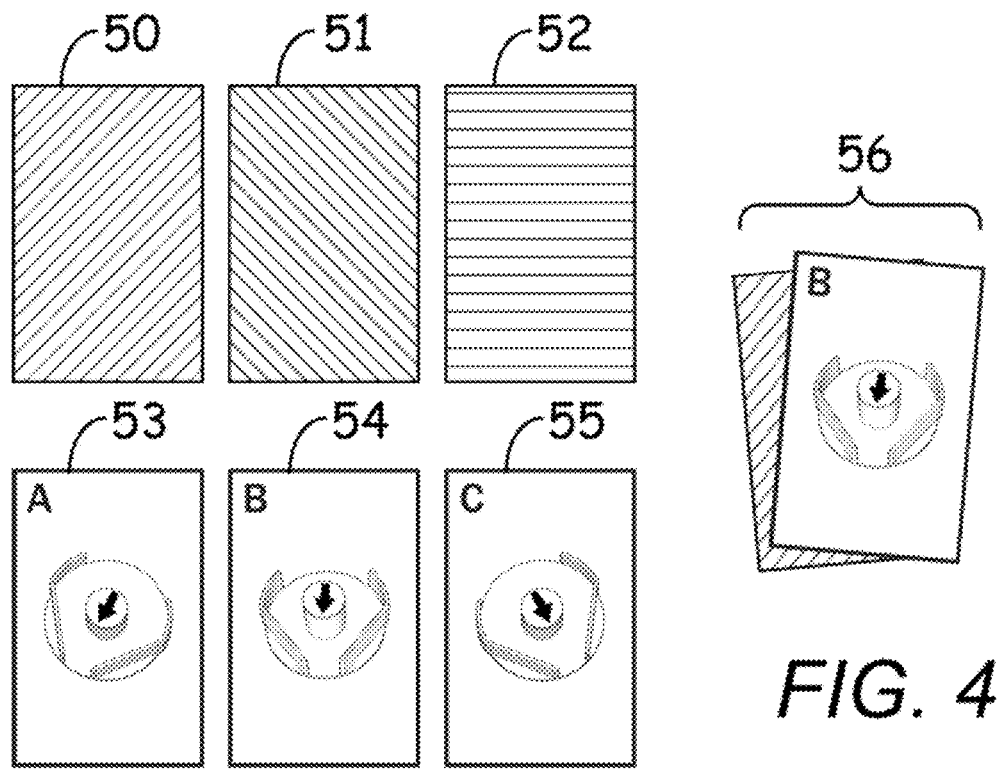
FIGS. 4 and 5 depict an enlarged face view of certain of a random path selecting deck of playing cards of the game of FIG. 1.

Referring now to FIGS. 1 and 4, there is shown a sampling of cards from card deck 16 (FIG. 1). Three colored cards 50, 51 and 52 bear individual distinctive color indicia, and may indicate correspondence between the card and one of the dials 5, 6 and 7 (FIG. 1). For example, the RED card 50 corresponding to dial 5, the GREEN card 51 corresponding to dial 6, and the BLUE card 52 corresponding to dial 7. Cards 53, 54 and 55 bear dial settings indicia and may indicate the three settings of a dial, together with letter indicia A, B and C corresponding to the three dial positions. By combining one of the cards 50, 51 and 52 with one of the cards 53, 54, and 55, a player may indicate a particular dial and its position. The card pair 56 collectively specifies that the RED dial should be set to position B, its down position. Other alternative card-dial correspondence may be used, for example L, D and R (not shown) could indicate dial positions left, down and right. The letter A, B and C designations are preferred in the present embodiment because they are a natural and well known progression, and they may help promote teaching a very young player the beginning letters of the alphabet.

Referring now to FIG. 5, there is shown a successful combination of cards (meld) 60 achieved by combining a number card 61 with two dial settings card pairs RED-A (50 and 53) and GREEN-C (51 and 55). During a turn, a player may lay down these cards in the indicated order, then set the dials accordingly and launch a ball on its gravitational decent to determine success in reaching the goal target well, in this case the target well bearing the number "3." The ball may reach a different well, either because the meld 60 is incorrect, or because the player did not manipulate the dials correctly to correspond to the settings shown in meld 60.

Referring now to FIG. 6, there is shown another play of the game 25 with another combination of cards (meld) 62. In this depiction a player has attempted to reach the third goal target well by setting the red dial 5 to its A position and the green dial 6 to its C position. After launching one ball 3 the player has achieved success with the ball 3 terminating its descent in the goal well 59 bearing the indicia number "3".

The present game presents many teaching opportunities for a parent or teacher working with a child. For example, the meld 60 may be described in terms that relate to the worlds of mathematics or computers. Mathematically it resembles an equation, where the answer "3" depends on the variables RED, A, GREEN, and C. This introduces the concept of starting with a known value and manipulating variables to achieve that value. As a computer concept the meld may introduce the concept of executing commands one at a time in a predetermined manner, where the meld is analogous to a written computer program and the ball machine is analogous to a computer that executes the program.

Referring now to FIGS. 1, 2 and 7, the ball release device 4 will now be described in greater detail. The device 4 includes a knob 63 having a permanent magnet 70 embedded fixedly in an opening on the underside of knob 63. The magnet 70 may be similar to those used in the dials. A corresponding permanent magnet 71 embedded in the playfield base (FIG. 2) under the feed knob 63 causes the knob to be attracted back to its reset position when released following manual rotation. The reset position is the normal at rest position with which it accepts the next ball 3. To release one ball, a player turns ball feed knob 63 in the clockwise direction, launching one ball, then releases the knob 63, allowing it to spring back to its reset position, ready to launch the next ball.

The knob 63 is rotatably mounted on a post 30 (FIG. 2) by being received within a hole 69 (FIG. 7) on the underside of knob 63. The reset position is the position where it accepts the next ball 3 within a curved recess 64 as shown in FIG. 1. To release one ball, a player rotates manually the ball feed knob 63 in the clockwise direction, launching one ball of a series of the balls aligned in a row on a ball ramp 67 inclined slightly toward the recess 64. A pair of ears 65 and 66 limit rotation of the knob 63 by engaging an end of a playfield guide 68. When the player releases the rotated knob 63, and it snaps back by the attraction of magnets 70 and 71 to the reset position, the ear 65 engages the end of the guide 68 (FIG. 1), ready to launch the next ball.

Referring now to FIG. 8, there is shown an alternative playing card format for the game 25. This format combines the dial color and position cards into single cards. Therefore, card 80A serves the purpose of specifying in a single card that the RED dial is set to its "A" position, instead of having a separate card for the RED dial and a second card for its "A position". Similarly, cards 80B, 80C, 81A, 81B, 81C, 82A, 82B, and 82C bear indicia illustrating dial colors and their positions using single cards.

To illustrate the feature that new games may be created by adding playing card formats or types, a "wild card" 83 may be included in the card deck 16 (FIG. 1) that adds a further element of strategy for advanced players. In an advanced game with players drawing and discarding cards to try to construct a combination of cards (meld) to reach a desired goal, a player may lack the necessary cards to reach the goal. For example, if the playfield appears as in FIG. 1 with the RED dial 5 in the uppermost position nearest the ball release device 4, and a player has no red dial cards (either 80A, 80B or 80C) but has several green dial cards, the player may play a card 83 bearing indicia "Rearrange Dials" to remove two or more dials and re-position them on the playfield. In this instance the player would relocate the green to the top position previously occupied by the red dial, thereby "activating" the player's green dial cards.

Referring now to FIG. 9, there is shown an alternative goal in the form of a ball tray 90 which serves the same purpose as ball trays 8 and 17 (FIG. 1), namely to provide multiple target wells into which balls may be directed. The ball tray 90 is fabricated in an articulated manner comprising an elongated base 91 and a goal strip 92 having a series of side by side wells. A hinge such as a living hinge (not shown) may be implemented in an injection molded plastic part. An adhesive label 93 may be applied to the bottom base 91 to customize identities of the ball target wells. The strip 93 may be readily peeled off and replaced to allow any custom designation of ball targets. Magnets 94 and 95 serve the same purpose as magnets 13 and 14 (FIG. 1), namely, to attach releasably the ball tray to the playfield using magnets.

In FIG. 9 the numbered wells of the ball tray 8 of FIG. 1 may be replaced according to the inscriptions on adhesive strip 93 bearing indicia as indicated in the following table, wherein the three dial colors are abbreviated to three-letter equivalents RED, GRN and BLU:

| Target wells in FIG. 1 | Custom target wells on strip 93 | Dial Settings |
|---|---|---|
| 1 | H | RED-A, GRN-A |
| 2 | L | RED-A, GRN-B |
| 3 | N | RED-A, GRN-C |
| 4 | M | RED-B |
| 5 | O | RED-C, BLU-A |
| 6 | E | RED-C, BLU-B |
| 7 | asterisk | RED-C, BLU-C |

By utilizing letters as ball targets, spelling games may be devised. One such game may be to challenge competing teams of players to spell as many words as possible under a time limit, for example 5 minutes. A word is spelled by setting dials and directing balls into lettered wells in order to form words. The asterisk may add additional interest and challenge because it may represent any letter. Using the custom target strip 93, the following dial combinations would direct three balls to spell the word "eon", where dial combination (a) would direct a ball into the "E" well, dial combination (b) would direct a ball into the "O" well, and dial combination (c) would direct a ball into the "N" well.
(a) RED-C/BLU-B
(b) RED-C/BLU-A
(c) RED-A/GRN-C Another letter-based game is to decode secret messages using the ball machine. A parent, teacher or team may devise encoded messages and write them down using colored markers, such as the following encoded message:
(a) RED-A, GRN-C
(b) RED-C, BLU-A
(c) RED-B
(d) RED-C, BLU-A
(e) RED-C, BLU-C
(f) RED-C BLU-B
where "RED-A" indicates the letter A written with a red marker, "GRN-C" indicates the letter C written with a green marker, and so on. A challenging team may employ the letters shown on adhesive label 93 (FIG. 9), and give the clue, "Do you want ice cream?" The decoding team may then set the dials in the order indicated by the clues, launch balls, and write down each letter to discover the secret message. For example, the two dial settings (a) lead to the letter "N". The asterisk adds a further challenge because once the letters are written down, if the answer includes one or more asterisks, the decoding team must deduce the letter or letters represented by the asterisk or asterisks. The coded message above is decoded by the game as NOMO*E, which may be deduced to spell "NO MORE."

Turning now to FIGS. 10 and 11 there is shown an educational game 125 constructed according to another embodiment, which is similar to the game 25 of FIG. 1, and which is adapted for combining multiple playfields to construct larger ball machines in order to increase the number of dials and ball targets. Three playfields 100, 100A and 100B and their associated components such as decision making devices similar to the decision making devices 5, 6 and 7 of the game 25, are disposed on an inclined platform 101. The individual playfields are held in place with rails 110, 111, 111A, 110B and 117, and transition ramp 187. Rollable devices such as balls 103 may leave the top playfield via two cutouts 114 and 115 in a ball tray or guide 108. A transition guide such as ramp 187 directs the balls rolling through the cutouts 114 and 115 either to playfield 100A or 100B. Balls rolling through cutout 114 proceed to playfield 100A, and balls rolling through cutout 115 proceed to playfield 100B. With the FIG. 10 decision making dial settings, dial 106 causes a ball 103 to roll into a target goal well, while dials 105 and 107 cause a ball to roll through cutout 115, proceed down transition ramp 187, and fall into ball machine 100B. From there the ball machine 100B dial settings direct the ball into the ball goal target 116B.

Lower playfields 100A and 100B do not require ball release mechanisms such as 104, instead using posts 130A and 130B for deflecting balls to take a trajectory toward decision making devices. By combining playfields in this manner the number of decision making dials may be extended from 3 to 9, and the number of target goal wells may be extended to 19. The 19 target goal wells result from five wells in the top tray 108 of playfield 100, seven wells in target tray 108C of playfield 100A, and seven wells in target tray 108B of playfield 100B. By adding pass-through ball tray 108, for example, to lower playfields 100A and 100B, and providing appropriate transition ramps such as 187, one skilled in the art will realize that the number of the playfields may be expanded to any number within reason.

FIG. 11 is an enlarged view of the ball target goal 108 showing in more detail the cutouts or openings 114 and 115. Graphical indicia arrows 118 and 119 on the adhesive label may indicate to the player that these ball destinations represent not target wells, but instead paths to the lower playfields 100A and 100B.

Turning now to FIG. 12 there is shown a game 225 which is constructed according to still another embodiment and which is similar to game 25, except the game 225 includes an alternative configuration of guide ramps that may be arrayed on the playfield. A portion of an inclined playfield 201 is shown broken away for illustration purposes. Decision making dial 205 is similar to dials 5, 6 and 7 (FIG. 1). The three dial exits are identified as A, B and C to correspond to the three dial settings of left, down and right, respectively. It will now be shown that due to the configuration of guide ramps, a rollable device such as a ball (not shown) entering the dial rolls under the force of gravity into one of the three playfield ramp openings 229, 230 or 231.

Consider first a ball exiting the dial in its A position. The ball exits the dial at A, gaining speed as it travels down guide ramp 220, and falls onto ramp 227. Proceeding down ramp 227, and due to its high rate of speed and momentum, the ball jumps over the gap 230 between guide ramps 227 and ramp 228, traverses ramp 228, and finally drops through the playfield gap 231.

Consider a second example where a ball exiting the dial in its B position. The ball exits the dial at B, rolling downwardly into the channel formed by walls 221 and 222. Due to raised guides in the form of bumps 224 and 225, the ball loses much of its velocity as it collides with the bumps. Therefore, when the ball drops to ramp 227, it moves slowly enough down ramp 227 to not jump the gap 230 as the first ball did, but instead drops through the playfield gap 230.

Consider a third example where a ball exits the dial in its C position. The ball exits the dial at C, gaining speed as it travels down ramp 223, and due to its high rate of speed, jumps to ramp 226, and from there drops through the playfield gap 229.

Different ramp configurations can make the correspondence of dial settings and exit positions less apparent than passing a ball straight through, as for example in FIG. 1. This poses additional challenge for players of the game. The configuration of FIG. 12 may be used as a teaching opportunity, for example asking how one ball descending over ramp 227 drops through gap 230, while another, descending over the same ramp, drops through gap 231.

Turning now to FIGS. 14 and 15, there is shown an alternative implementation of decision making devices, and an alternative implementation of a random selection device, constructed according to an embodiment. A game 325 is similar in configuration to game 25 of FIG. 1, with the exception that decision-making devices 305, 306 and 307 may employ movable gates, and a random selection device 351 may be implemented as a pair of dice. Gates 340-349 may comprise vertically slidable flat plates that rest in a downward closed blocking position engaging the top surface of a playfield 301 as for example 341, or which a player may raise to allow a ball to pass through as, for example, raised gates 340 and 348. Random selection device 351 may be a pair of dice 352 and 353 that a player may toss to indicate which of the numbered wells in ball tray 308 should serve as the ball destination. While the combination of gates 340-342 and 343-345 may implement three possible exits of a decision-making device, the combination of gates 346-349 may implement four possible exits.

For the player-selected gates in FIG. 14, a launched ball 303 travels along the path 354. The ball travels through open gate 340, and proceeds down ramp portion 360. Sidewall 351 prevents the ball from exiting the playfield 301 on its left edge, and the ball proceeds over closed gates 346 and 347 before dropping through the raised gate 348 and entering the goal well 344 bearing indicia "3" of the ball tray 308.

Turning now to FIG. 15, the decision making ball ramp may be formed by the top surfaces of fixed posts 350, 370, 371, and 372, and movable gates 346, 347, 348 and 349. A player may raise vertically one of the movable gates such as 348 to cause a ball to drop through the ramp. In the present example the ball enters the decision making ramp portion 350, continues down over the posts and gates 350, 346, 370, 347 and 371, then drops through an opening or gap 390 under the raised gate 348. The gates may be color coded to enable correspondence with playing cards which designate particular gates and their states, either closed as 346, 347 or 349, or open as 348. The various exits may be designated with the letters A, B, C and D indicia (not shown). The end post 361 may include a riser that stops the ball from its downward progress if none of the gates is raised to allow the ball to roll through.

Turning now to FIG. 16, there is shown an educational game 425 which is constructed according to another embodiment and which includes a playfield 401. The game 425 can be disposed horizontally to the ground during play. The game 425 can be placed flat on a horizontal surface, for example a tabletop. Decision making devices such as dials 405A, 406A and 407A are generally similar to dials 5, 6 and 7 (FIG. 1) with the exception that the center posts are omitted, and the arrow indicators such as 453 are flush with the dial surface, in order not to present any obstruction through the dial. Walls 468 and 469 provide a starting point for a rollable device such as a miniature vehicle 403, for example a car, which may be powered by a windup mechanism or with a motor and battery or other. The dials may be turned by grasping them by their perimeter walls, and magnets (not shown) in both the playfield 401 and dials secure releasably the dials in their selected positions. Because the vehicle 403 is self-powered, it can make its way through the playfield without requiring gravitational assistance. In FIG. 16, the RED dial is set to its "A" position and the GREEN dial is set to its "A" position, resulting in the vehicle traversing the path 400 and coming to rest in the target goal bearing indicia number "1" of a ball tray 408. BLUE dial 407A is set to its "C" position, but due to the setting of the RED dial which directs the ball to the GREEN dial, its setting is irrelevant in this example. Although the character of the game may be different than previously described, this version shares all the advantages of the dial-based version, for example correspondence with random selection cards in the deck that add variety and strategy to multiple modes of play.

Design choices in the present game do not limit the scope of the invention. There may be any number of decision making devices (such as dials), and they may be arrayed into any combination of decision making devices, guides and goals. The number and placement of individual targets such as wells included in the goals may be any number. Each decision making device may have any number of positions, providing there are two or more.

The advantages of the present game include, without limitation, a game that is at least partially mechanical in nature, and may not be using batteries. Being mechanical, the game supports fine motor skills. The inventive game is goal oriented and encourages discovery, experimentation, guided play and group interaction, and it can be played alone or in a group. The combination of a card deck or other random selection devices, and a ball machine allow variations in game play, encouraging innovation and allowing the game play to be suited to players of almost any age or ability. Also, this use of the word "about" herein indicates a plus or minus tolerance of 10 percent.

While the foregoing written description of the game enables one of ordinary skill to make and use what is considered presently to be the best mode thereof, those of ordinary skill will understand and appreciate the existence of variations, combinations, and equivalents of the specific embodiments, and examples herein. The game should therefore not be limited by the above described embodiments, and examples, but by all disclosed and undisclosed embodiments within the scope and spirit of the game.

I claim:

1. A game comprising:
a playfield;
a rollable device for moving along the surface of the playfield;
a plurality of playfield guides for directing the rollable device along a path of travel on a surface of the playfield;
three or more target goals disposed on the playfield, each target goal being adapted to receive the rollable device;
a group of decision making devices mounted moveably on the playfield to adjust manually selectively the path of travel, the decision making devices each having an entrance structure and an exit structure; and
a plurality of playfield guides disposed at the exit structures of the decision making devices for directing the rollable device from the entrances to selected ones of the playfield guides;
wherein the rollable device is enabled to move along a user selected path of travel including entrances and user selected playfield guides of a user selected series of the decision making devices to a selected target goal.

2. The game of claim 1 further including a random path selecting device for indicating a given path of travel for the rollable device.

3. The game of claim 2 wherein the random path selecting device includes playing cards.

4. The game of claim 2 wherein the random selecting device includes dice.

5. The game of claim 1 wherein the playfield is angularly inclined at an angle relative to the horizontal of between about 30 degrees and about 60 degrees.

6. The game of claim 5 wherein the incline angle is about 45 degrees.

7. The game of claim 1 wherein the rollable device is a ball.

8. The game of claim 1 wherein the rollable device is a miniature vehicle.

9. The game of claim 1 wherein the playfield is angularly inclined and the playfield guides are ramps.

10. The game of claim 1 further including alternate playfields, each removably attached to a base of the playfield.

11. The game of claim 1 wherein the playfield can be used in a horizontal disposition and the playfield guides are fences and further include alternate target goals.

12. The game of claim 1 wherein the target goals include means for attaching the target goals to the playfield and further include alternate target goals.

13. The game of claim 12 wherein the means for attaching includes a first plurality of magnets for attaching the target goals removably to the playfield, further including a second plurality of magnets for serving as detents for the decision making devices, and a third plurality of magnets for enabling a rollable device dispenser to serve as a reset.

14. The game of claim 1 wherein the decision making devices are positionally arranged in hierarchical ranks on the playfield.

15. The game of claim 1 wherein the decision making devices each include a turntable rotatably mounted on the playfield between the two or more exit structures.

16. The game of claim 1 wherein the decision making devices include a series of manual user operable gates.

17. A method of making a game, comprising:
positioning a plurality of playfield guides on a playfield for directing a rollable device along a path of travel on a surface of the playfield;
positioning three or more target goals on the surface of the playfield, each target goal adapted for receiving the rollable device;
moveably mounting a group of decision making devices along the path of travel to adjust manually selectively the path of travel, the decision making devices each having an entrance structure and an exit structure;
positioning a plurality of playfield guides disposed at the exit structures of the decision making devices to direct the rollable devices from the entrances to the selected ones of the playfield guides; and wherein the rollable device is enabled to move along a user selected path of travel including entrances and user selected playfield guides of a user selected series of the decision making devices to a selected target goal.

* * * * *